(12) United States Patent
Hoogerbrugge et al.

(10) Patent No.: US 10,204,229 B2
(45) Date of Patent: Feb. 12, 2019

(54) METHOD AND SYSTEM FOR OPERATING A CACHE IN A TRUSTED EXECUTION ENVIRONMENT

(71) Applicant: NXP B.V., Eindhoven (NL)

(72) Inventors: Jan Hoogerbrugge, Helmond (NL); Wilhelmus Petrus Adrianus Johannus Michiels, Reusel (NL); Joppe Willem Bos, Wijgmaal (NL)

(73) Assignee: NXP B.V., Eindhoven (NL)

( * ) Notice: Subject to any disclaimer, the term of this patent is extended or adjusted under 35 U.S.C. 154(b) by 149 days.

(21) Appl. No.: 15/464,711

(22) Filed: Mar. 21, 2017

(65) Prior Publication Data

US 2018/0276392 A1    Sep. 27, 2018

(51) Int. Cl.
| | | |
|---|---|---|
| *G06F 21/60* | (2013.01) | |
| *G06F 21/64* | (2013.01) | |
| *G06F 21/79* | (2013.01) | |
| *H04L 9/06* | (2006.01) | |
| *H04L 9/08* | (2006.01) | |

(Continued)

(52) U.S. Cl.
CPC ........ *G06F 21/602* (2013.01); *G06F 12/0891* (2013.01); *G06F 21/64* (2013.01); *G06F 21/79* (2013.01); *H04L 9/0643* (2013.01); *H04L 9/0897* (2013.01); *H04L 9/3236* (2013.01); *G06F 12/1408* (2013.01); *G06F 21/74* (2013.01); *G06F 2212/1021* (2013.01); *G06F 2212/1052* (2013.01); *G06F 2212/402* (2013.01); *G06F 2212/60* (2013.01)

(58) Field of Classification Search
CPC ............... G06F 21/602; G06F 12/0891; G06F 2212/1021; G06F 2212/1052; G06F 2212/402; G06F 2212/60
See application file for complete search history.

(56) References Cited

U.S. PATENT DOCUMENTS 9,563,769 B2    2/2017   Hunacek et al.
2012/0216049 A1    8/2012   Boivie et al.
(Continued)

OTHER PUBLICATIONS

Maxim Integrated Products, Dallas Semiconductor, DS5250 High-Speed Secure Microcontroller, 2003, 3 pages.
(Continued)

*Primary Examiner* — Techane Gergiso
(74) *Attorney, Agent, or Firm* — Daniel D. Hill

(57) ABSTRACT

A data processing system having rich execution environment (REE) and a trusted execution environment (TEE) is provided. In the data processing system, an unsecure memory is coupled to the REE and used for storing encrypted data for use in the TEE. The TEE may have a cache for storing the encrypted data after it is decrypted. The data in both the memory and the cache is organized in blocks, and the cache is smaller than the memory. An interpreter is provided in the TEE, along with a service block in the REE, for fetching and decrypting the data to be stored in the cache. The interpreter checks an integrity of the decrypted data using a hash tree having multiple levels. In the event of a cache miss, all blocks of the hash tree in a path from the data block to a root block are retrieved from the memory in one access operation. A method for operating the cache in the data processing system is also provided.

20 Claims, 4 Drawing Sheets

(51) Int. Cl.
*H04L 9/32* (2006.01)
*G06F 12/0891* (2016.01)
*G06F 12/14* (2006.01)
*G06F 21/74* (2013.01)

(56) References Cited

U.S. PATENT DOCUMENTS

| | | |
|---|---|---|
| 2016/0103858 A1 | 4/2016 | Katz et al. |
| 2016/0134660 A1* | 5/2016 | Ponsini ............... H04L 9/3234 726/1 |
| 2016/0232335 A1* | 8/2016 | Violleau ............... G06F 21/30 |
| 2016/0234176 A1* | 8/2016 | Chu .................... H04L 63/0428 |
| 2016/0254918 A1* | 9/2016 | Liu ..................... H04L 9/3213 713/156 |
| 2016/0283750 A1 | 9/2016 | Durham et al. |
| 2016/0328335 A1 | 11/2016 | Bhattacharyya et al. |
| 2016/0350534 A1* | 12/2016 | Poornachandran ..... G06F 21/57 |
| 2016/0364341 A1* | 12/2016 | Banginwar ........... G06F 12/145 |
| 2017/0063532 A1 | 3/2017 | Bhattacharyya et al. |
| 2018/0046808 A1* | 2/2018 | Cammarota ........ G06F 12/0877 |

OTHER PUBLICATIONS

Ekberg, J. et al., "The Untapped Potential of Trusted Execution Environments on Mobile Devices", IEEE Security & Privacy, vol. 12, Issue 4, Jul.-Aug. 2014, 12 pages.

Gassend, B. et al., "Caches and Hash Trees for Efficient Memory Integrity Verification", The Ninth International Symposium on High-Performance Computer Architecture, 2003, 12 pages.

Suh, G. et al., "Aegis: A Single-Chip Secure Processor", IEEE Design & Test of Computers, vol. 24, Issue 6, Nov.-Dec. 2007, pp. 570-580.

Yang, J. et al., "Fast Secure Processor for Inhibiting Software Piracy and Tampering", 36th Annual IEEE/ACM International Symposium on Microarchitecture, 2003, 10 pages.

\* cited by examiner

CACHE WITH 40 BLOCKS OF CODE, DATA AND HASH TREE BLOCKS — 24

| | | | |
|---|---|---|---|
| DATA/CODE | LEVEL-3 | DATA/CODE | DATA/CODE |
| LEVEL-3 | DATA/CODE | DATA/CODE | LEVEL-1 |
| LEVEL-2 | LEVEL-2 | DATA/CODE | DATA/CODE |
| DATA/CODE | DATA/CODE | LEVEL-3 | DATA/CODE |
| LEVEL-3 | DATA/CODE | DATA/CODE | LEVEL-3 |
| DATA/CODE | LEVEL-3 | DATA/CODE | DATA/CODE |
| DATA/CODE | DATA/CODE | LEVEL-2 | DATA/CODE |
| DATA/CODE | DATA/CODE | DATA/CODE | DATA/CODE |
| DATA/CODE | DATA/CODE | LEVEL-3 | DATA/CODE |
| DATA/CODE | LEVEL-3 | DATA/CODE | DATA/CODE |

FIG. 3

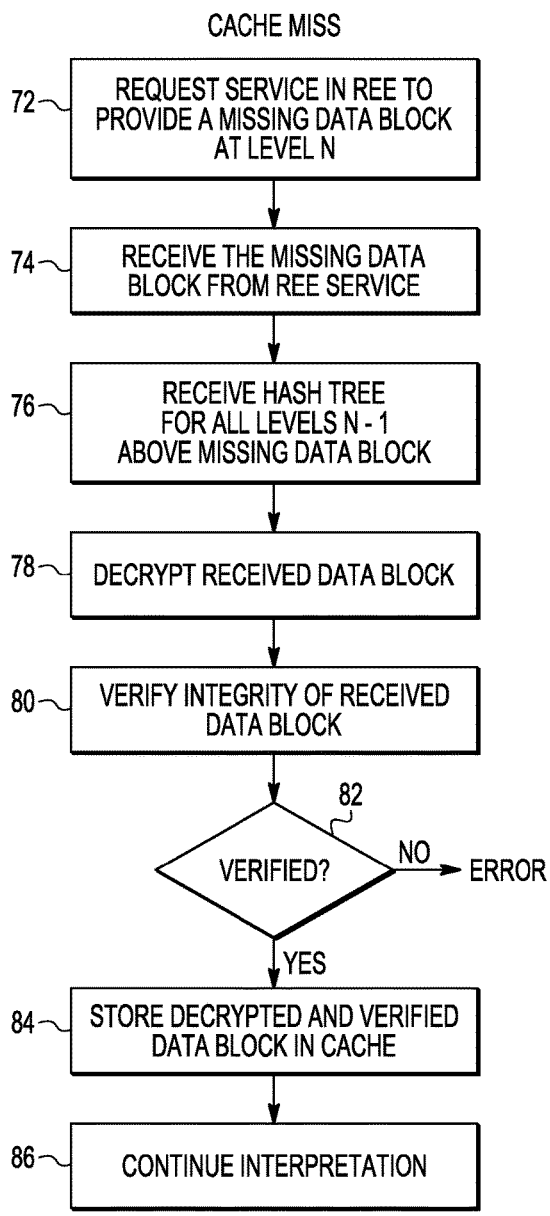
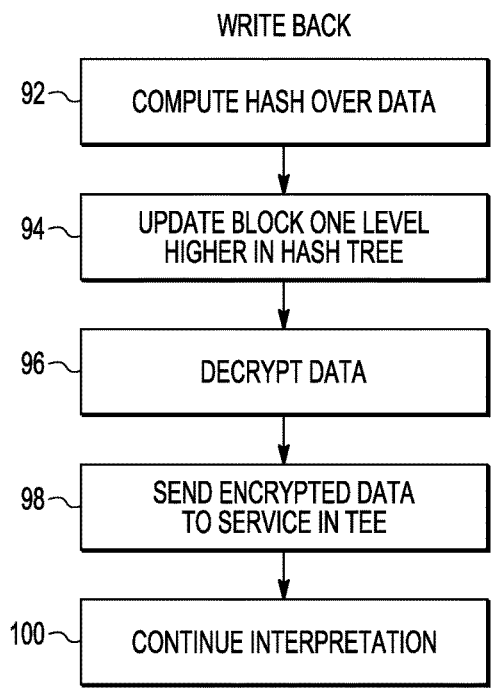
FIG. 4
FIG. 5

METHOD AND SYSTEM FOR OPERATING A CACHE IN A TRUSTED EXECUTION ENVIRONMENT

BACKGROUND

Field

This disclosure relates generally to data processing systems and more specifically to a method and system for operating a cache in a trusted execution environment (TEE).

Related Art

Secure processors may store code and data in a plain, unencrypted, state in a secure memory if a secure memory is available. Otherwise, the secure processor must first encrypt the data and store the encrypted data in an unsecure memory, such as a memory external to the secure processor. When the data is fetched for use by the secure processor, it is first decrypted and stored in a secure cache in the secure processor. When the data has been modified, and is written back to external memory, it is encrypted again. In the secure cache of the processor, the code and data can be stored decrypted and this is considered secure as accessing this is much harder than accessing it on the bus to external memories. Decryption is only needed on a cache miss. Similarly, encryption is only necessary when data is evicted from a cache and written back to external memory.

When data is written to the secure cache, integrity of the data is protected by computing hashes over these blocks of data. The hashes may be organized in hash trees having multiple levels. A hash value of the whole external memory can be kept as a single hash value at the root of the hash tree. The hash value at the root of the hash tree should not leave the secure cache. Whenever a block of data is read from external memory (either a block with code/data or a block with hashes) a hash is computed on the data and compared with the hash value that is stored one level higher in the hash tree. Whenever a block is written to external memory, the hash value of the block is computed and this value is used to update the hash one level higher in the hash tree.

The secure cache is usually much smaller than the external memory and will not store the entire hash tree at the same time. On a cache miss, a block of data is fetched from external memory and decrypted. If a required hash tree level for verifying the block of data is not in the secure cache, there is another cache miss, and the required hash tree level is fetched from external memory and decrypted. Dealing with multiple cache misses to verify the data is inefficient and delays processing.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 3 illustrates a cache memory of the TEE of FIG. 1 in accordance with an embodiment.

FIG. 4 illustrates a flow chart of a method for handling a cache miss in the cache memory of FIG. 1.

FIG. 5 illustrates a flow chart of a method for handling a write back in the cache memory of FIG. 1.

DETAILED DESCRIPTION

Figure 1:
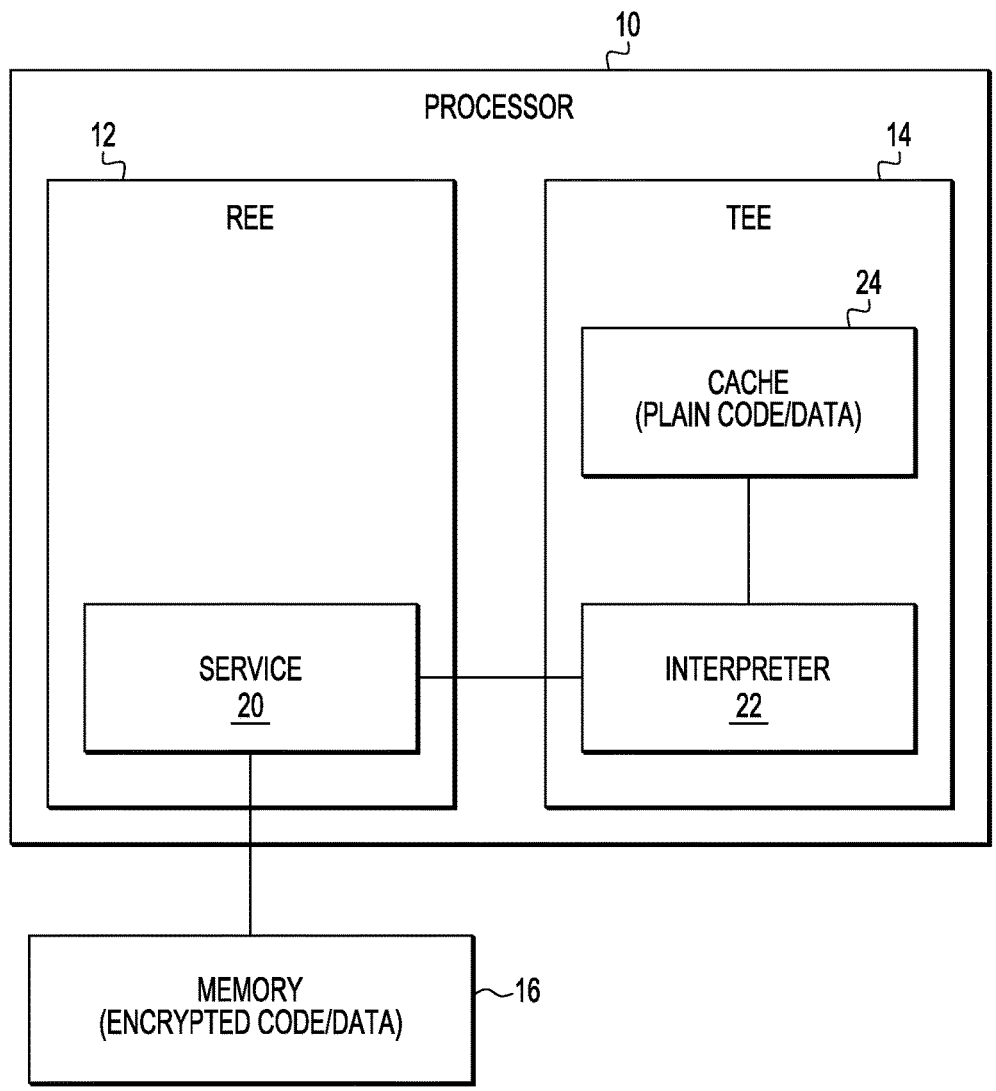
FIG. 1 illustrates a data processing system in accordance with an embodiment.

Generally, there is provided, a data processing system having a rich execution environment (REE) and a trusted execution environment (TEE). An unsecure memory is coupled to the REE and used for storing encrypted data and/or instructions for use in the TEE. The TEE may have a cache for storing the encrypted data after it is decrypted. The data in both the memory and the cache is organized in blocks, and the cache is smaller than the memory. An interpreter is provided in the TEE for fetching and decoding or decrypting the data. When the data is fetched, it is fetched in blocks. After the interpreter decrypts the data and stores the data in the cache, a hash tree having multiple levels is used to verify the data. In the event a level of the hash tree is not in the cache during the data verification, the interpreter fetches all blocks in the tree that are on the path from the block that triggered the miss to the root of the hash tree. Likewise, if a block of data from the memory needs to be evicted to make room for the fetched hash tree level, all of the blocks below the block chosen to be evicted are also evicted. In the event of a write back of dirty data to the memory, the portion of the hash tree corresponding to the dirty data is updated. At the same time, all levels of the hash tree are updated.

By updating and fetching all blocks of the hash tree path, the problem of multiple misses in the cache to retrieve the hash tree is prevented, thus improving processor efficiency.

In one embodiment, there is provided, a data processing system having a rich execution environment (REE) and a secure element, a method for operating a cache memory in the secure element, the method comprising: providing an interpreter in the secure element; determining that data to be executed by the interpreter is not located in the cache memory; generating a cache miss in the secure element; retrieving a block of encrypted data from memory in the REE corresponding to the cache miss; retrieving all blocks of a hash tree path from the block corresponding to the encrypted data to a root of the hash tree; storing all of the blocks of the hash tree path in the secure element; decrypting the encrypted data using the interpreter; verifying an integrity of the decrypted data using the hash tree; storing the verified decrypted data in the cache memory of the secure element. If a hash tree block is evicted from the cache memory prior to retrieving the encrypted data from memory in the REE, then all hash tree levels below the evicted hash tree block may be evicted from the cache memory. The interpreter may be one of either a fetch-decode-execute type interpreter or a just-in-time compiler based virtual machine. The method may further comprise: determining that decrypted data in the cache memory is dirty; updating a hash tree associated with the dirty decrypted data; encrypting the dirty decrypted data to become encrypted dirty data using the updated hash tree; evicting the dirty data from the cache memory to the memory in the REE; and evicting all levels of the updated hash tree below the evicted dirty data to the memory in the REE. The hash tree and the data may both be stored in the same cache memory. The secure element may be characterized as being more secure than the REE. The cache memory may be a software cache and the secure element may be a trusted execution environment (TEE). The data in the cache memory may organized in blocks of memory cells. The data processing system may be implemented in an integrated circuit.

In another embodiment, there is provided, a data processing system comprising: a memory for storing encrypted data; a rich execution environment (REE) comprising a service coupled to the memory, the service arranged to access the memory in response to requests for data; and a secure element, the secure element being relatively more secure than the REE, the secure element comprising: a cache for storing decrypted data; and an interpreter is coupled to the cache and to the service, the interpreter is arranged to fetch, decode, and decrypt the encrypted data retrieved from the memory by the service and to store the decrypted data in the cache, wherein the interpreter checks an integrity of the decrypted data using a hash tree having multiple levels, wherein in response to a cache miss of a block of the hash tree, all of the blocks of the hash tree in a path from the block that triggered the cache miss to a root block are retrieved from the memory, and wherein all of the blocks of the hash tree in the path are retrieved from the memory in one access operation of the memory. The data may comprise blocks of data or instructions. The data may be accessed as blocks of data in both the memory and the cache. The secure element may be a trusted execution environment (TEE). The interpreter may determine that the decrypted data in the cache is dirty, and may update a hash tree associated with the dirty decrypted data; wherein the interpreter may encrypt the dirty decrypted data to become encrypted dirty data using the updated hash tree, wherein the dirty data may be evicted from the cache memory to the memory, and wherein all levels of the updated hash tree below the evicted dirty data may be evicted to the memory. The data processing system may be implemented in an integrated circuit.

In yet another embodiment, In a data processing system having a rich execution environment (REE) and a secure element, a method is provided for operating a cache in the secure element, the method comprising: providing an interpreter in the secure element; determining that data to be executed in the secure element is not located in the cache; generating a cache miss in the secure element using the interpreter; sending a request for the data to a service in the REE using the interpreter; retrieving a block of encrypted data from memory in the REE; retrieving all blocks of a hash tree in a path from the block of encrypted data to a root of the hash tree, the retrieved blocks corresponding to the block of encrypted data; storing all levels of the hash tree in the cache in the secure element, wherein the hash tree levels are each stored as blocks in the cache; decrypting the block of data using the interpreter; verifying an integrity of the block of decrypted data using at least a portion of the hash tree; storing the verified block of decrypted data in the cache of the secure element. The cache may be smaller than the memory. The data processing system may be implemented on an integrated circuit. If a hash tree block is determined to be evicted from the cache prior to the encrypted data being retrieved from the memory in the REE, then all hash tree blocks below the evicted hash tree block may be evicted from the cache and stored in the memory in the REE. The secure element may be characterized as being a trusted execution environment (TEE).

FIG. 1 illustrates a data processing system in accordance with an embodiment. The data processing system includes a processor 10 and an external memory 16. In one embodiment, processor 10 is implemented on a single integrated circuit. Memory 16 may be implemented on the same integrated circuit or on one or more different integrated circuits. Processor 10 includes a rich execution environment (REE) 12 and a trusted execution environment (TEE) 14. REE 12 may be, for example, a mobile operating system in a handheld device. In the illustrated embodiment, REE 12 includes service block 20. Service block 20 receives and services requests to access external memory 16. TEE 14 provides a more secure processing environment than REE 12. External memory 16 can be any type of volatile or non-volatile memory, such as for example, static random access memory (SRAM), dynamic random access memory (DRAM), magnetic random access memory (MRAM), flash, electrically erasable programmable read only memory (EEPROM). Note that for discussion purposes, the term data includes data, instructions or program code, or a combination of data and code. Also, note that cache 24 can be a hardware cache or a software cache.

Instead of a secure processor, TEE 14 includes interpreter 22 and cache 24. In one embodiment, interpreter 22 is a fetch-decode-execute type interpreter. In another embodiment, interpreter 22 may be a "just-in-time" compiler based virtual machine. Interpreter 22 is bi-directionally connected to both service 20 and cache 24. Cache 24 may be any type of volatile or non-volatile memory, or a software implemented memory. In the illustrated embodiment, interpreter 22 sends requests for blocks of encrypted data to service 20. Interpreter 22 decrypts the data and provides the decrypted data to cache 24. Interpreter 22 also verifies the data using a hash tree. During a write-back of data from cache 24 to memory 16, interpreter 22 first re-computes the hash tree, encrypts the data, and sends the encrypted data to service 20. Service 20 then provides the encrypted data to external memory 16.

In one embodiment, ARM® Trustzone® technology, by ARM Limited, provides TEE 14. In other embodiments, TEE 14 may be any type of secure element. TEE 14 is a secured environment that provides process isolation. The TEE runs in parallel (and may share resources with) REE 12. REE 12 is fully open, runs a rich operating system (OS), and can interact with TEE 14. TEE 14 does not generally provide tamper resistance, i.e., it does not implement countermeasures against, for instance, Differential Power Analysis (DPA) or Differential Fault Analysis (DFA). In one embodiment, interpreter 22 is software running in TEE 14.

Figure 2:
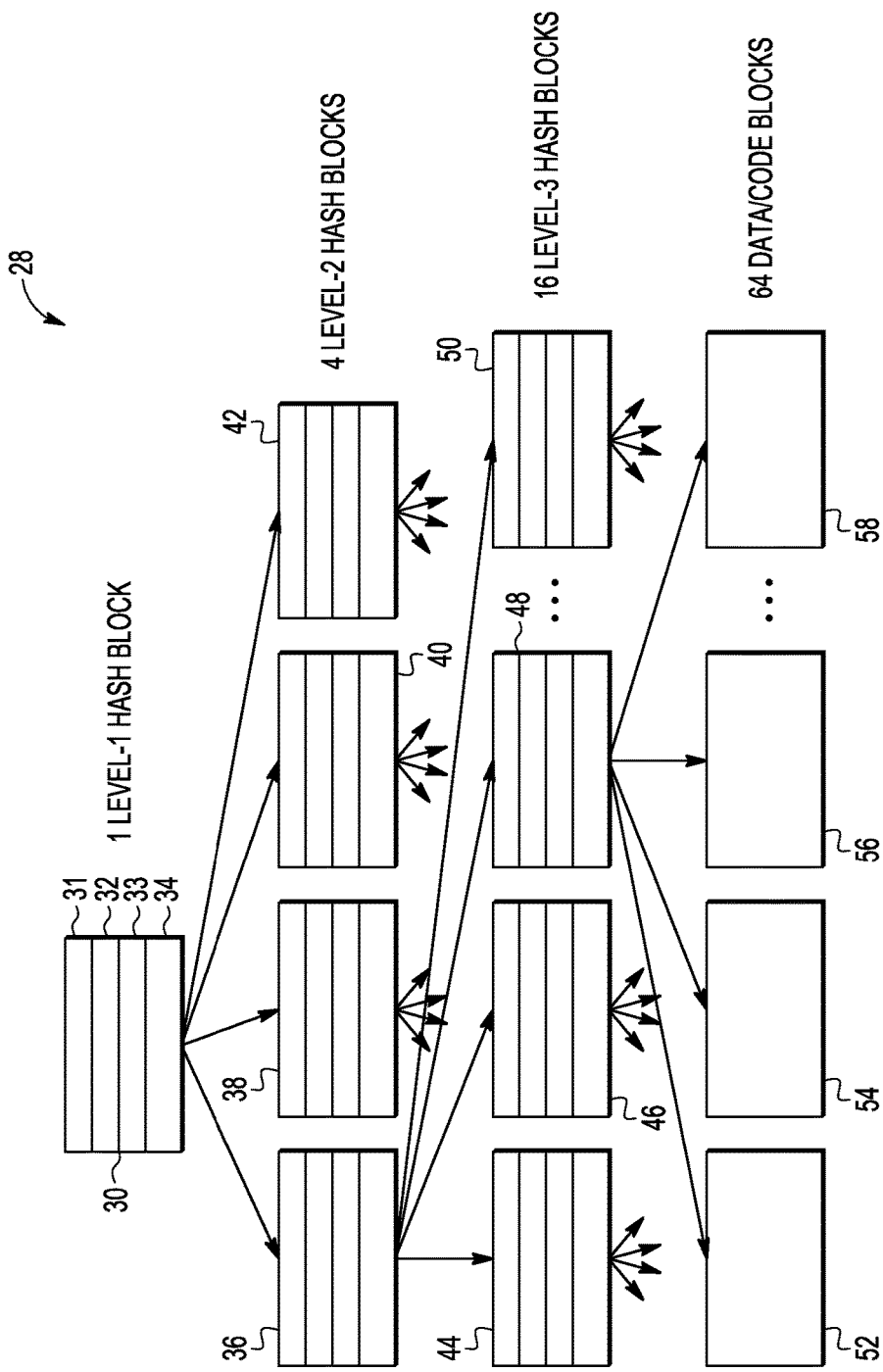
FIG. 2 illustrates a graphical representation of a hash tree in accordance with an embodiment.

FIG. 2 illustrates a graphical representation of one example of hash tree 28 in accordance with an embodiment. Hash tree 28 includes hash tree blocks 30, 36, 38, 40, 42, 44, 46, 48, 50, and 52. Hash tree 28 is organized in levels. Level 1 is the root level and includes one hash block 30. Level 2 includes hash blocks 36, 38, 40, and 42. Level 3 includes 16 hash blocks, represented by hash blocks 44, 46, 48, and 50. Data blocks 52, 54, 56, and 58 represent 64 data/code memory blocks that may be thought of as the last level of hash tree 28. Note that other hash trees can have a different number of levels and each level can have a different number of blocks. Each hash block includes four hash values. For example, block 30 includes hash values 31, 32, 33, and 34.

Multiple paths are available from one level of hash tree 28 to the next, depending of the data block being hashed. Several examples of possible paths between hash blocks of different levels are illustrated in FIG. 2 using arrows for the blocks of each level. Whenever a block is read from external memory 16 (either a block with code/data or a block with hashes) a hash is computed on the data and the computed hash is compared with the hash value that is stored in a block one level higher in hash tree 28. Whenever a block is written to external memory 16, the hash value of the block is computed and this value is used to update hash tree 28 one level higher. When cache 24 is of sufficient size and hash tree 28 is properly implemented inside TEE 14, then the provided security has a limited impact on the speed of interpreter 22. However, cache 24 in TEE 14 may not be large enough to fully contain hash tree 28, so at least some of hash tree 28 must be stored encrypted in external memory 16. The use of hash trees to verify data integrity is well known, generally, and will not be discussed in detail.

FIG. 3 illustrates cache memory 24 of TEE 14 of FIG. 1 in accordance with an embodiment. Cache memory 24 may be implemented in hardware or in software. Cache memory 24 may be organized in memory blocks of, for example, 64 or 128 bytes each. In the illustrated embodiment, cache memory 24 includes 40 blocks for storing the hash tree levels and data/code illustrated in hash tree 28 of FIG. 2. To store all of hash tree 28 in cache 24 would require space for at least 85 memory blocks, as determined by adding up the blocks in each level of FIG. 2. However, because cache 24 can only store 40 blocks at one time, at least a portion of the hash tree and data/code must be stored in external memory 16. The method for organizing data and hash tree blocks of cache 24 is beyond the scope of this description.

FIG. 4 illustrates a flow chart of a method 70 for handling a cache miss in the cache 24 of FIG. 1. Method 70 begins at step 72. At step 72, service is requested from service block 20 to provide a missing data block at level n in cache 24 from external memory 16. In hash tree 28 of FIG. 2, the data/code blocks correspond to a $4^{th}$ level. In other embodiments, the levels may be different. At step 74, the missing data block is retrieved, or fetched, from external memory 16 through service block 20 and provided to interpreter 22 in TEE 14. At step 76, all of the hash tree blocks in the hash tree path above the retrieved data block are retrieved from memory 16. That is, service block 20 fetches all blocks in the tree that are on the path from the block that triggered the miss to the root of the hash tree. For example, if block 54 in FIG. 2 is missing from cache 24, blocks 48 and 36 are fetched if they are not already in cache 24. The root block 30 should always be fetched as well. The hash tree levels are read from memory 16 in one access operation. The one access operation may be a burst operation from memory 16, where one block is provided at a time in consecutive bursts. In other embodiments, the one access operation may be different. At step 78, the data block is decrypted in interpreter 22. At step 80, the integrity of the data block is verified using hash tree 28. At decision step 82, it is determined if the integrity of the data block is verified. If the answer is NO, an error occurred and processing stops. If the data integrity is verified the YES path is taken to step 84. At step 84, the decrypted and verified data block is stored in cache 24. At step 86, interpretation continues by returning to step 72 when a cache miss occurs.

FIG. 5 illustrates a flow chart of method 90 for handling a write back operation in the system of FIG. 1. Method 90 begins at step 92. At step 92, a hash is computed over the data block to be written back to memory 16. The data block may be written back because it has been modified, and is therefore "dirty". However, the data block may simply be evicted from the cache to make room for a currently needed data block. If a block is evicted, then all of the blocks below the evicted block are also evicted. For example, if block 54 is to be evicted from cache 24, then blocks 44, 46, 48, 50, 52, 54, 56, and 58 are also evicted. At step 94, the hash is also updated one level higher in hash tree 28. At step 96, the data block is encrypted by interpreter 22. Any encryption algorithm may be used, such as for example, the RSA encryption algorithm, the DES (Data Encryption Standard) algorithm, or the AES (Advanced Encryption Standard) algorithm. At step 98, interpreter 22 sends the encrypted data block to service block 20 to be written to unsecured storage in memory 16. At step 100, interpretation is continued and returns to step 92 as needed to write back dirty or evicted data blocks.

Note that data may be further protected using one or more of obfuscation and tamper proofing of data processing system 10.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention. Also, the disclosed embodiments may be implemented in software, hardware, or a combination of software and hardware.

As used herein, the term "non-transitory machine-readable storage medium" will be understood to exclude a transitory propagation signal but to include all forms of volatile and non-volatile memory. When software is implemented on a processor, the combination of software and processor becomes a single specific machine. Although the various embodiments have been described in detail, it should be understood that the invention is capable of other embodiments and its details are capable of modifications in various obvious respects.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. In a data processing system having a rich execution environment (REE) and a secure element, a method for operating a cache memory in the secure element, the method comprising:
   providing an interpreter in the secure element;
   determining that data to be executed by the interpreter is not located in the cache memory;
   generating a cache miss in the secure element;
   retrieving a block of encrypted data from memory in the REE corresponding to the cache miss;

retrieving all blocks of a hash tree path from the block corresponding to the encrypted data to a root of the hash tree;
storing all of the blocks of the hash tree path in the secure element;
decrypting the encrypted data using the interpreter;
verifying an integrity of the decrypted data using the hash tree;
storing the verified decrypted data in the cache memory of the secure element.

2. The method of claim 1, wherein if a hash tree block is evicted from the cache memory prior to retrieving the encrypted data from memory in the REE, evicting all hash tree levels below the evicted hash tree block from the cache memory.

3. The method of claim 1, wherein the interpreter is one of either a fetch-decode-execute type interpreter or a just-in-time compiler based virtual machine.

4. The method of claim 1, further comprising:
determining that decrypted data in the cache memory is dirty;
updating a hash tree associated with the dirty decrypted data;
encrypting the dirty decrypted data to become encrypted dirty data using the updated hash tree;
evicting the dirty data from the cache memory to the memory in the REE; and
evicting all levels of the updated hash tree below the evicted dirty data to the memory in the REE.

5. The method of claim 1, wherein the hash tree and the data are both stored in the same cache memory.

6. The method of claim 1, wherein the secure element is characterized as being more secure than the REE.

7. The method of claim 1, wherein the cache memory is a software cache and the secure element is a trusted execution environment (TEE).

8. The method of claim 1, wherein the data in the cache memory is organized in blocks of memory cells.

9. The method of claim 1, wherein the data processing system is implemented in an integrated circuit.

10. A data processing system comprising:
a memory for storing encrypted data;
a rich execution environment (REE) comprising a service coupled to the memory, the service arranged to access the memory in response to requests for data; and
a secure element, the secure element being relatively more secure than the REE, the secure element comprising:
a cache for storing decrypted data; and
an interpreter is coupled to the cache and to the service, the interpreter is arranged to fetch, decode, and decrypt the encrypted data retrieved from the memory by the service and to store the decrypted data in the cache, wherein the interpreter checks an integrity of the decrypted data using a hash tree having multiple levels, wherein in response to a cache miss of a block of the hash tree, all of the blocks of the hash tree in a path from the block that triggered the cache miss to a root block are retrieved from the memory, and wherein all of the blocks of the hash tree in the path are retrieved from the memory in one access operation of the memory.

11. The method of claim 10, wherein the data comprises blocks of data or instructions.

12. The method of claim 10, wherein the data is accessed as blocks of data in both the memory and the cache.

13. The method of claim 10, wherein the secure element is a trusted execution environment (TEE).

14. The method of claim 10, wherein the interpreter determines that the decrypted data in the cache is dirty, and updates a hash tree associated with the dirty decrypted data; wherein the interpreter encrypts the dirty decrypted data to become encrypted dirty data using the updated hash tree, wherein the dirty data is evicted from the cache memory to the memory, and wherein all levels of the updated hash tree below the evicted dirty data are evicted to the memory.

15. The method of claim 10, wherein the data processing system is implemented in an integrated circuit.

16. In a data processing system having a rich execution environment (REE) and a secure element, a method for operating a cache in the secure element, the method comprising:
providing an interpreter in the secure element;
determining that data to be executed in the secure element is not located in the cache;
generating a cache miss in the secure element using the interpreter;
sending a request for the data to a service in the REE using the interpreter;
retrieving a block of encrypted data from memory in the REE;
retrieving all blocks of a hash tree in a path from the block of encrypted data to a root of the hash tree, the retrieved blocks corresponding to the block of encrypted data;
storing all levels of the hash tree in the cache in the secure element, wherein the hash tree levels are each stored as blocks in the cache;
decrypting the block of data using the interpreter;
verifying an integrity of the block of decrypted data using at least a portion of the hash tree;
storing the verified block of decrypted data in the cache of the secure element.

17. The method of claim 16, wherein the cache is smaller than the memory.

18. The method of claim 16, wherein the data processing system is implemented on an integrated circuit.

19. The method of claim 16, wherein if a hash tree block is determined to be evicted from the cache prior to the encrypted data being retrieved from the memory in the REE, all hash tree blocks below the evicted hash tree block are evicted from the cache and stored in the memory in the REE.

20. The method of claim 16, wherein the secure element is characterized as being a trusted execution environment (TEE).

* * * * *